United States Patent [19]
Matsumoto et al.

[11] Patent Number: 6,038,144
[45] Date of Patent: Mar. 14, 2000

[54] DC-DC CONVERTER

[75] Inventors: Tadahiko Matsumoto, Yokohama; Eito Moromizato, Machida, both of Japan

[73] Assignee: Murata Manufacturing Co., Ltd., Japan

[21] Appl. No.: 09/273,974

[22] Filed: Mar. 22, 1999

[30] Foreign Application Priority Data

Mar. 27, 1998 [JP] Japan .................................. 10-100054

[51] Int. Cl.⁷ .......................... H02M 3/335; H02M 5/42
[52] U.S. Cl. ............................................... 363/19; 363/97
[58] Field of Search ................................ 363/16, 18, 19, 363/95, 97, 131

[56] References Cited

U.S. PATENT DOCUMENTS

| | | | |
|---|---|---|---|
| 5,175,675 | 12/1992 | Uramoto | 363/19 |
| 5,412,555 | 5/1995 | Uramoto | 363/18 |
| 5,499,175 | 3/1996 | Noro | 363/16 |
| 5,923,543 | 7/1999 | Choi | 363/21 |

Primary Examiner—Matthew Nguyen
Attorney, Agent, or Firm—Ostrolenk, Faber, Gerb & Soffen, LLP

[57] ABSTRACT

A DC-DC converter has improved electrical characteristics, including a voltage-reduction detection circuit and a zero-voltage switching control circuit. In the voltage-reduction detection circuit, in a period when a switching device is OFF, when a drain voltage of the switching device is reduced to an input voltage level, a voltage of a connection section of registers is allowed to reach a threshold voltage level to reverse a signal outputted from a NOR gate from a higher level to a lower level. In the zero-voltage switching control circuit, the signal reduced as above is received and a signal outputted from a NOR gate is reversed to a higher level, according to which a pulse-control signal outputted from a NOR gate to the switching device is reversed to a higher level to turn on the switching device. Since the output pulse-control signal from the NOR gate controls switching operations performed by the switching device, no switching loss occurs and zero-voltage switching can be performed; accordingly, short-circuit loss also does not occur.

8 Claims, 4 Drawing Sheets

DC-DC CONVERTER

BACKGROUND OF THE INVENTION

1. Field of the Invention

The present invention relates to a direct current-direct current converter (hereinafter referred to as a "DC-DC converter") that stably outputs predetermined direct current (DC) and DC voltages.

2. Description of the Related Art

Figure 2:
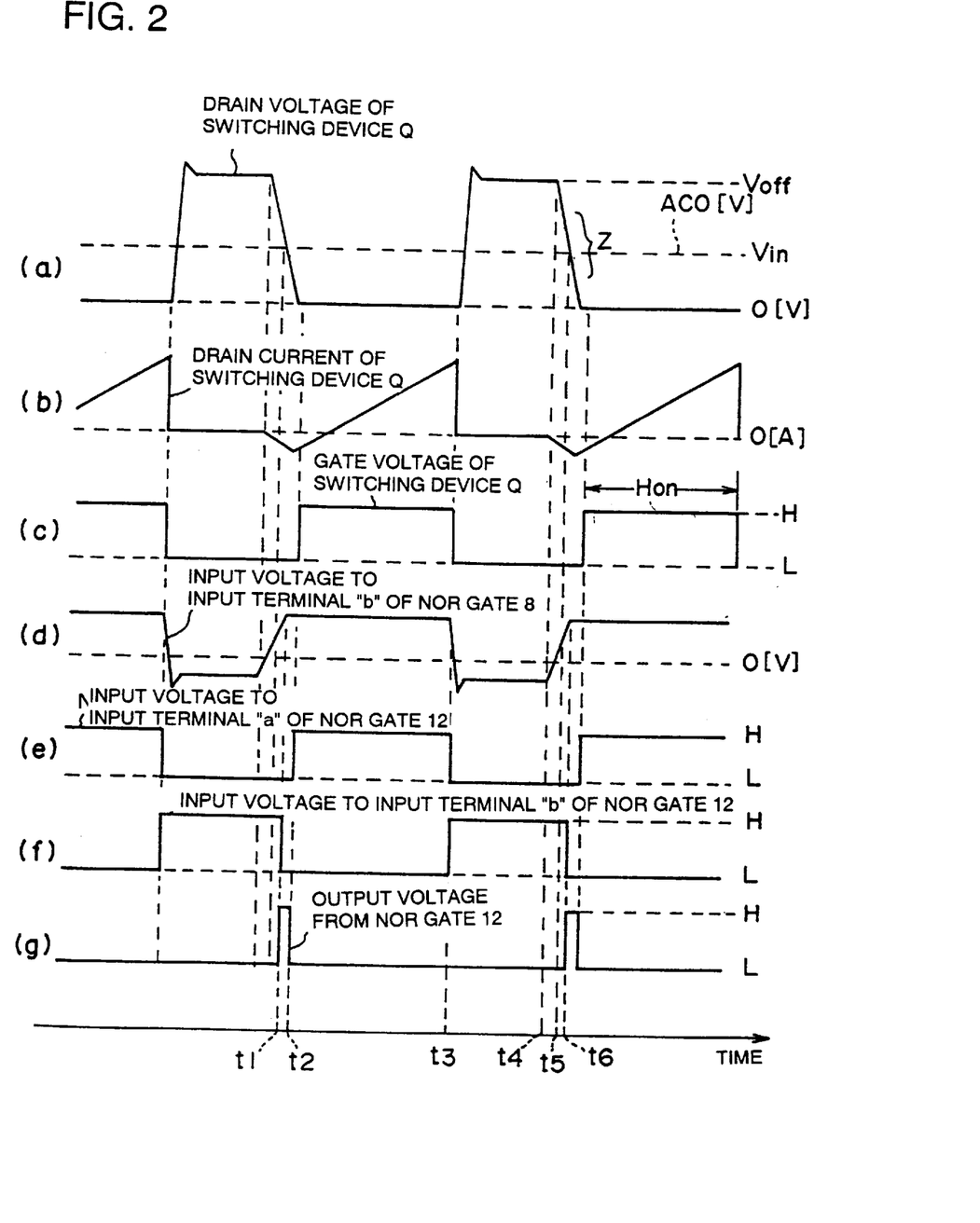
FIG. 2 is a time chart showing operating waveforms in configurations of main circuits among the circuits shown in FIG. 1.
Figure 5:
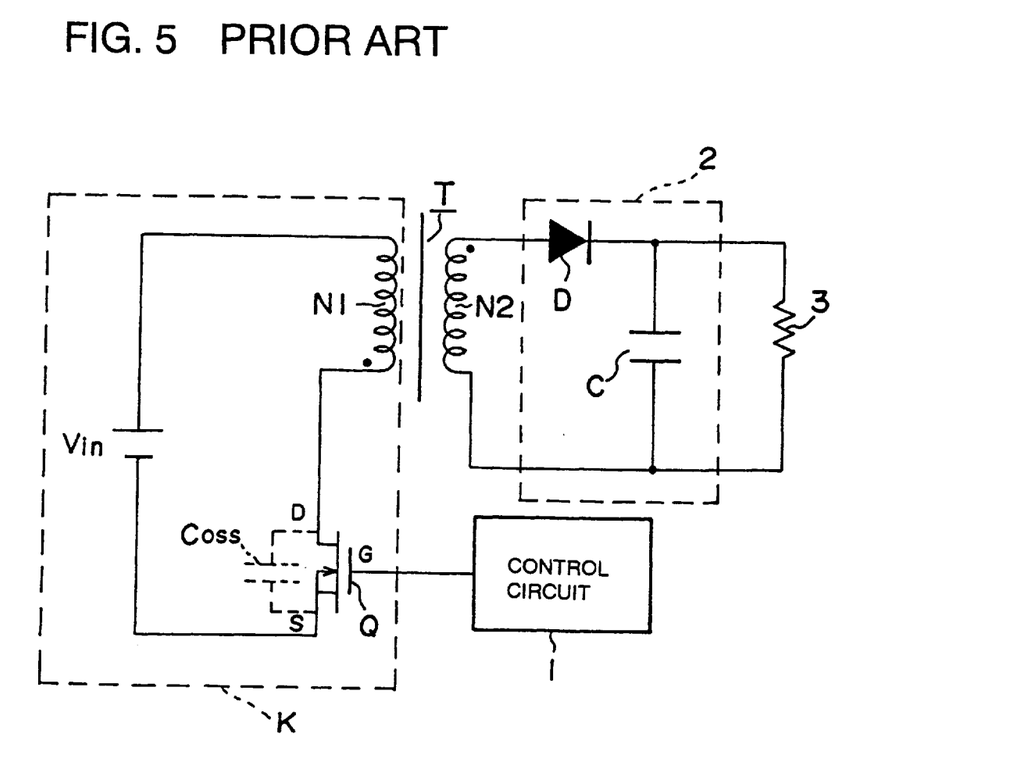
FIG. 5 shows an example of main circuit configurations of a flyback converter.

FIG. 5 shows an example main circuit configuration of a flyback converter (a DC-DC converter) used as a built-in component for switching power supplies and the like. This flyback converter has a transformer T. At the side of a primary coil N1 of the transformer T. there is formed a primary-side circuit K including a switching device Q formed of a transistor device (in the example converter shown in FIG. 5, a MOS-FET (metal oxide semiconductor-field effect transistor) is used). To this switching device Q there is connected a control circuit 1 for outputting a pulse-control signal, as shown in FIG. 2(c), which controls ON/OFF operations performed by the switching device Q. In the side of a secondary coil N2 of the transformer T, there is provided a rectifying and smoothing circuit 2 including a rectifying diode D and a smoothing capacitor C.

When the level of the pulse-control signal applied by the aforementioned control circuit to a gate (G) of the switching device Q is at a high level (H), the switching device Q is turned ON. In a period when the switching device Q is ON, an input voltage "Vin" allows the primary coil N1 and the switching device Q to be conductive, and energy is charged in the primary coil N1.

Thereafter, when the level of the pulse-control signal goes from the high level (H) to the low level (L), the switching device Q is turned OFF, a primary-side pulse, as shown in FIG. 2(a), is generated at the secondary side, and electrical charge is charged in a parasitic capacitance "Coss" arranged between the drain (D) and the source (S). In a period when the switching device Q is OFF, the energy charged in the primary coil N1 is transferred to a secondary coil N2 and is outputted. The outputted energy is then commutation-smoothed in the rectifying and smoothing circuit 2 and a DC signal is outputted to a load 3.

The aforementioned control circuit 1 has a configuration that performs variable control of an ON period (high-level period) of the pulse-control signal to be applied to the switching device Q in order to stabilize a level of the current or voltage which is outputted to the load 3 from the secondary side at a predetermined level. That is, the control operation of the control circuit 1 allows stabilization of the level of the output current or the output voltage at a predetermined level.

The control circuit 1 can be considered to be formed by use of commonly commercially available PWM control ICs (pulse-width modulation control integrated circuits) or PFM control ICs (pulse-frequency modulation control integrated circuits). However, these control ICs are expensive and not suitable for use in a DC-DC converter in which cost reduction is necessary. For this reason, an RCC (ringing choke converter) type DC-DC converter (a self-excitation type DC-DC converter) is widely used.

However, switching operations in the RCC DC-DC converter are slow; therefore, switching loss occurs when the switching device Q turns ON and OFF. Furthermore, in the RCC DC-DC converter, the switching device Q turns ON from a state when electrical charge is charged in the parasitic capacitance "Coss"; therefore, the electric charge in the parasitic capacitance "Coss" discharges and passes through a section between the drain and the source, causing short-circuit at the switch-ON time.

Such switching loss and short-circuit loss increasingly occurs proportional to the switching frequency. This makes it difficult to achieve size reduction of switching power supplies that must meet increasing switching frequency demands.

SUMMARY OF THE INVENTION

To solve the aforementioned problems, an object of the present invention is to provide a DC-DC converter that avoids the switching loss and short-circuit loss, improves electric characteristics, and is inexpensive.

To these ends, according to one aspect of the present invention, there is provided a DC-DC converter that has a primary-side circuit to perform LC resonance synchronously with ON/OFF operations performed by a switching device by using a DC input voltage for generating a primary-side pulse in a period when the switching device is OFF to output energy to a secondary side; an oscillation circuit to output a pulse-control signal that controls the ON/OFF operations to the switching device, in which variable control is performed for an ON period of the pulse-control signal outputted from the oscillation circuit to stabilize current and voltage outputted from the secondary side, the oscillation circuit being formed of a multivibrator having at least two logical elements; and a zero-voltage switching control circuit that detects reduction of the primary-side pulse-control signal to be applied to the switching device in a period when the switching device is OFF and after detecting an application voltage for the switching device from an OFF-period voltage level which is higher than the level of the input voltage to an input voltage region, reverses a level of the pulse-control signal outputted from the multivibrator to a higher level in order to turn ON the switching device.

In the DC-DC converter described above, in the period when the application voltage for the switching device is OFF, after reduction of the application voltage for the switching device from the OFF-period voltage level to the input voltage level which is an AC-zero-voltage level of the primary-side is detected, the level of the pulse-control signal outputted from the multivibrator may be reversed to a higher level in order to turn ON the switching device.

Furthermore, the DC-DC converter described above may include a zero-voltage switching operation pause circuit that pauses switch-ON operations in the zero-voltage switching control circuit in a period between a time when the pulse-control signal outputted from the multivibrator is reversed by the zero-voltage switching control circuit to a higher level and a time when the next primary-side pulse is outputted.

Furthermore, according to the present invention described above, the oscillation circuit comprises at least two logical elements; and in the OFF period when the level of the pulse-control signal outputted to the switching device is low, when the application voltage for the switching device is detected to have been reduced from the OFF-period voltage level which is higher than the level of the input voltage region, the zero-voltage switching control circuit reverses the low level of the pulse-control signal multivibrator to a higher level in order to turn ON the switching device.

Furthermore, according to the present invention described above, when the application voltage is reduced to the level of the input voltage region, a parasitic capacitance has substantially no charge because of LC resonance; therefore, the switching device is turned ON in the foregoing state. This avoids the occurrence of the problem of short-circuit loss which may occur when the switching device is turned ON. Furthermore, occurrence of the problem of the switching loss can also be avoided because the pulse-control signal level can be quickly turned by the multivibrator from a lower level to a higher level and can be quickly reversed from a higher level to a lower level, in which switching loss does not substantially occur.

Furthermore, the DC-DC converter of the present invention can be manufactured without use of expensive parts, and in addition, as described above, it avoids both the switching loss and the short-circuit loss, solving the aforementioned problems.

Furthermore, although there may be duplicate descriptions, the present invention has advantages as described below.

The present invention has a configuration such that, in the period when the switching device is OFF, the application voltage for the switching device is detected to have been reduced to the level of the input voltage region to perform the zero-voltage switching in order to turn ON the switching device. Because of this configuration, the switching device can be turned ON in a state where the parasitic capacitance of the switching device is discharged, in which short-circuit loss can be substantially avoided.

Furthermore, in the period when the switching device is OFF, the application voltage for the switching device is reduced by LC resonance to a level exceeding the level of the input voltage region without exception; therefore, the present invention is configured such that the switching device is turned ON after the application voltage for the switching device is reduced to the level of the input voltage region, by which the switching device can be turned ON without fail.

Besides the present invention, there is a configuration in which an application voltage for a switching device is detected to have been reduced to a DC-zero-potential level. In the DC-DC converter, however, there is a case where the application voltage for the switching device is not reduced to the DC-zero-potential level. In such a case, with the configuration in which the application voltage for the switching device is detected to have been reduced to the DC-zero-potential level, the switching device cannot be turned ON. In the present invention, however, the application voltage for the switching device is reduced by LC resonance to the level of the input voltage region without exception; therefore, even when the application voltage for the switching device is not reduced to the DC-zero-potential level, the switching device can be turned ON without fail.

Furthermore, in the present invention, the oscillation circuit comprises the multivibrator formed of the logical elements, and ON/OFF operations by the switching device are controlled by the pulse-control signal outputted from the multivibrator; therefore, switching loss can be substantially avoided. Specifically, the level of the pulse-control signal outputted from the aforementioned multivibrator quickly turns from a higher level to a lower level or conversely from a higher level to a lower level to allow ON/OFF switching operations to be quickly performed, in which case switching loss can be substantially avoided.

As described above, both switching loss and short-circuit loss of the switching device can be avoided. Therefore, a DC-DC converter which sufficiently conforms to requirements for higher-frequency switching and for easier size reduction can be provided.

Furthermore, since the logical elements are used to form the circuits, the circuits can be formed without use of expensive ICs such as PWM control ICs and PFM control ICs. The logical elements are inexpensive; therefore, an inexpensive DC-DC converter can be provided. In this way, the present invention offers innovative advantages by providing a DC-DC converter at a price competitive with that of the RCC converter, and in addition, which substantially avoids switching loss and short-circuit loss to improve electrical characteristics so as to be better than those of the RCC type converter.

Furthermore, in a configuration in which the application voltage for the switching device is detected to have been reduced to the input voltage level which is an AC-zero-voltage level of the primary-side pulse, timing when the parasitic capacitance is completely discharged can be detected, and the switching device is thereafter turned ON; therefore, short-circuit loss which possibly occurs in ON operations by the switching device may be substantially avoided to the same extent as in the case described above.

Furthermore, in the configuration in which circuit operation of the zero-voltage switching control circuit pauses, circuit operation of the DC-DC converter may be allowed to pause in the period between the time when the pulse-control signal outputted from the multivibrator is reversed to a higher level and a time when the next primary-side pulse is outputted.

DETAILED DESCRIPTION OF EMBODIMENTS OF THE INVENTION

Referring to the accompanying drawings, a description will be given of an embodiment according to the present invention.

Figure 1:
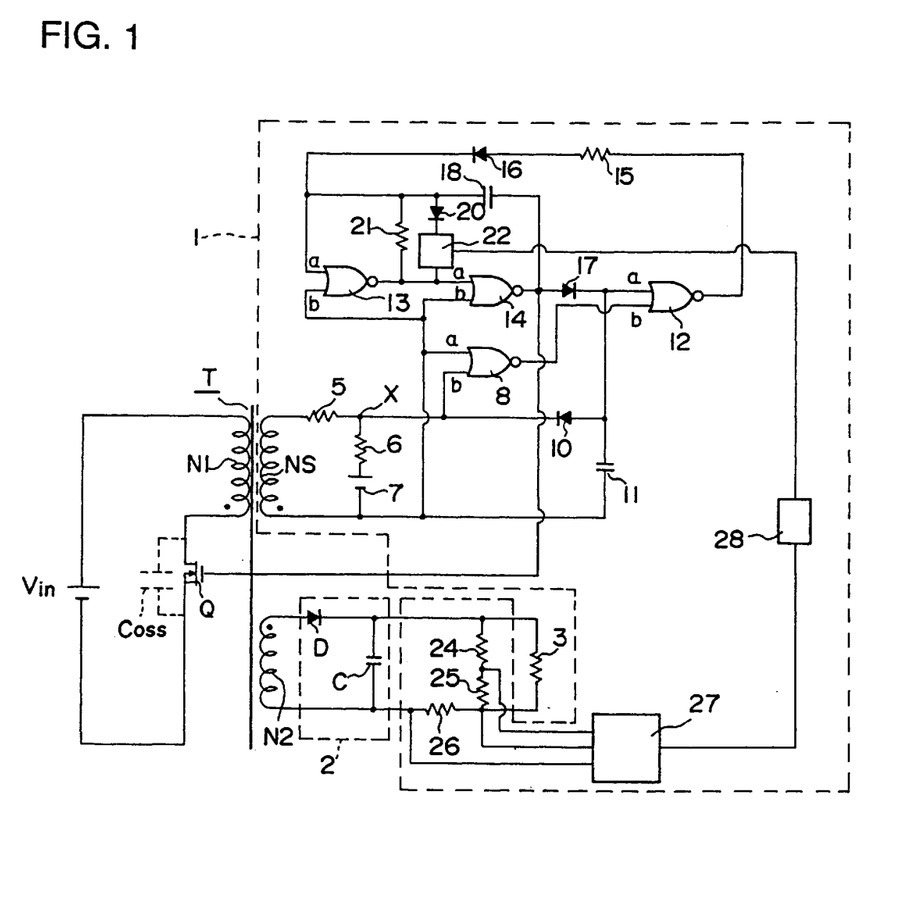
FIG. 1 shows a circuit configuration of an embodiment according to the present invention.

FIG. 1 shows main circuit configurations of a flyback converter (a DC-DC converter) according to this embodiment. In this embodiment, the same reference symbols are given to the same circuit configuration items as those of the flyback converter shown in FIG. 5, and a description regarding these same items is omitted.

A DC-DC converter of this embodiment is characterized in having a control circuit 1 that performs drive-control of a switching device Q, and it has a configuration in which the DC-DC converter can be inexpensive, and in addition, switching loss and short-circuit loss can be substantially avoided.

As shown in FIG. 1, a supplementary coil NS is provided, one end of a resistor 5 is connected to the supplementary coil NS, a resistor 6 is connected to another end of the resistor 5, another end of the resistor 6 is connected to a positive pole of a DC bias power supply 7, and a negative pole is connected to another end of the supplementary coil NS.

Figure 3:
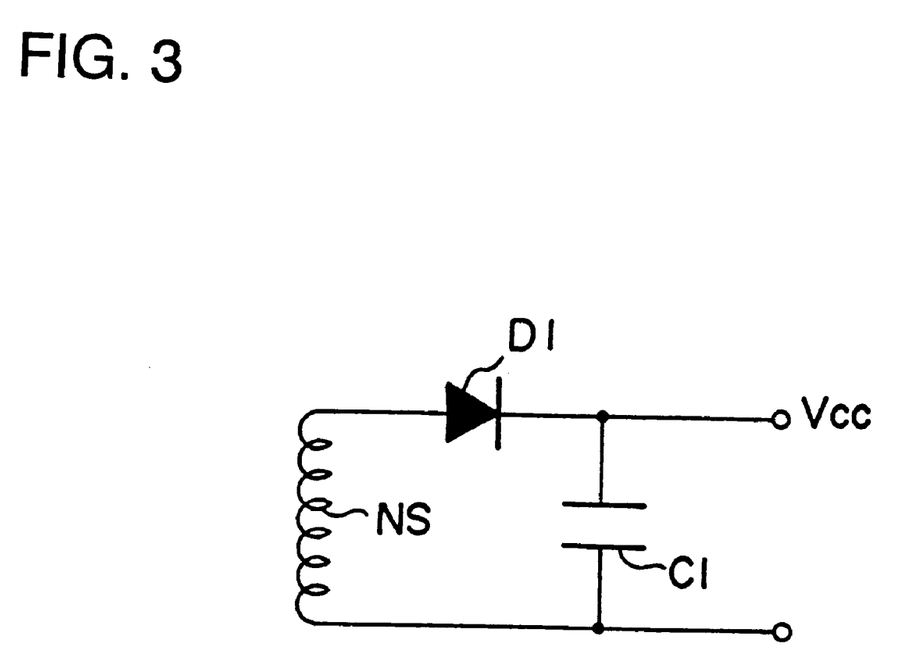
FIG. 3 shows an example of main circuit configurations of a DC bias power supply.

The DC bias power supply 7 is not restricted to a specific type but may be any type that is capable of outputting a DC voltage. Various circuit configurations may be applied and one example thereof is shown in FIG. 3. In the circuit shown in FIG. 3, energy outputted from the supplementary coil NS is commutation-smoothed by a commutation diode D1 and smoothing capacitor C1, and a DC voltage "Vcc" is outputted.

In FIG. 1, an input terminal "b" of a NOR gate (logical element) 8 and a cathode side of a diode 10 are connected in a connection section X of the resistor 5 and the resistor 6. One end of a capacitor 11 and an input terminal "a" of a NOR gate 12 (logical element) are connected at an anode side of the diode 10. Another end of the capacitor 11 is a connection section of the supplementary coil NS and the negative pole side of the DC bias power supply 7. An input terminal "a" of the NOR gate 8, an input terminal "b" of a NOR gate (logical element) 13, and input terminal "b" of a NOR gate (logical element) 14 are connected at the connection section of the supplementary coil NS and the negative pole side of the DC bias power supply 7.

An output terminal of the NOR gate 8 is connected to an input terminal "b" of the NOR gate 12, an output terminal of the NOR gate 12 is connected to one end of a resistor 15, an anode side of a diode 16 is connected to another end of the resistor 15, a cathode side of the diode 16 is connected to an input terminal "a" of the NOR gate 13, and an output terminal of the NOR gate 13 is connected to an input terminal "a" of the NOR gate 14. An anode side of a diode 17 and one end of a capacitor 18 are connected to an output terminal of the NOR gate 14, and a cathode side of the diode 17 is connected to an input terminal "a" of the NOR gate 12. Another end of the capacitor 18 is connected to an anode side of a diode 20, one end of a resistor 21, and an input terminal "a" of the NOR gate 13; and another end of the resistor 21 is connected to the input terminal "a" of the NOR gate 14.

A cathode side of the diode 20 is connected to an impedance variable circuit 22, and an output terminal of this impedance variable circuit 22 is connected to the input terminal "a" of the NOR gate 14.

A serially-connected item of output-voltage dividing resistors 24 and 25 is connected parallel to a load 3, and an output-current detection resistor 26 is serially formed between a smoothing capacitor C and the load 3. A connection section of the output-voltage dividing resistors 24 and 25, a connection section of the output-voltage dividing resistor 25 and the output-current detection resistor 26, and a connection section of the output-current detection resistor 26 and the capacitor C are connected to a predetermined input side of a feedback signal forming circuit 27, an output side of the feedback signal forming circuit 27 is connected to an input side of a feedback signal forming circuit 28, and an output side of the feedback signal forming circuit 28 is connected to the impedance variable circuit 22.

In this embodiment, the output terminal of the NOR gate 14 is connected to a gate of the switching device Q, and ON/OFF operations by the switching device Q are controlled by a pulse-control signal, as shown in FIG. 2(c), which is outputted from the NOR gate 14 to the gate of the switching device Q. Specifically, when the level of the pulse-control signal applied to the gate of switching device Q is a high level, the current path between the drain and source of the switching device Q is turned ON; when the level of the pulse-control signal applied to the gate of switching device Q is a low level, the current path between the drain and the source of the switching device Q is turned OFF.

An output-voltage detection circuit that divides and detects an output voltage outputted to the load 3 is formed of the output-voltage dividing resistor 24 and output-voltage dividing resistor 25, and an output-current detection circuit that detects the output current outputted to the load 3 is formed of the output-current detection resistor 26.

The aforementioned feedback signal forming circuit 27 has a circuit configuration that functions as below. When an output voltage outputted to the load 3 deviates from a specified output voltage and a detection voltage detected and outputted from the output-voltage detection circuit deviates from a reference voltage, the circuit outputs a feedback signal having a level according to a deviation of the detection voltage from the reference voltage. When an output current outputted to the load 3 deviates from a specified output current and a detection current detected and outputted from the output-current detection circuit deviates from a reference current, the circuit outputs a feedback signal having a level according to a deviation of the detection current from the reference current.

The feedback signal forming circuit 28 has a circuit configuration that transfers the feedback signal outputted from the feedback signal forming circuit 27 to the impedance variable circuit 22. This circuit may comprise, for example, a photocoupler. When a photocoupler is used, the impedance variable circuit 22 is isolated from the feedback signal forming circuit 27. In the isolated sections, the feedback signal is optically transferred from the feedback signal forming circuit 27 to the impedance variable circuit 22.

The NOR gates 13 and 14, the capacitor 18, and the resistor 21 form a multivibrator (a vibratory circuit) that oscillates and outputs the pulse-control signal, as shown in FIG. 2(c). The impedance variable circuit 22 comprises a variable impedance device in which impedance (equivalent resistance) varies according to the level of the feedback signal applied from the feedback signal forming circuit 27 through the feedback signal forming circuit 28. This impedance variable circuit 22 and the diode 20 form a pulse-width variable control circuit. This pulse-width variable control circuit has a circuit configuration in which, according to the aforementioned feedback signal level, the impedance variable circuit 22 and the diode 20 perform variable control of OFF-timing that reverses the level of the pulse-control signal, which is outputted from the multivibrator, from a high level to a low level, and then performs variable control of an ON period "Hon", as shown in FIG. 2(c), to stabilize the output signal to the load 3.

Reducing the ON period of the switching device Q allows the level of the output current or the output voltage to the load 3 to be lowered; in contrast, increasing the ON period of the switching device Q allows the level of the output current or the output voltage to the load 3 to be increased. Accordingly, when the level of the output current or the output voltage to the load 3 is shifted higher than the specified level, the impedance of the variable impedance device of the impedance variable circuit 22 varies in the direction where the ON period "Hon" of the pulse-control signal is shortened by the shift amount, by which the pulse-width variable control circuit performs variable control in the direction where the ON period of the pulse-control signal to be applied from the NOR gate 14 to the switching device Q is shortened and lowers the level of the output current or the output voltage to the specified level for compensation. In contrast, when the level of the output current or output voltage to the load 3 is shifted lower than the specified level, the impedance of the variable impedance device of the impedance variable circuit 22 varies in the direction where the ON period "Hon" of the pulse-control signal is lengthened by the shift amount, by which the pulse-width variable control circuit performs variable control in the direction where the ON period of the pulse-control signal is lengthened and increases the level of the output current or the output voltage to the specified level for compensation.

According to the supplementary coil NS, there is formed an application-voltage detection section of a switching device which indirectly detects an application voltage in a primary-side pulse that is to be applied in the section between the drain and the source of the switching device Q. Furthermore, a voltage-reduction detection circuit is formed by the supplementary coil NS, the resistors 5 and 6, the DC bias power supply 7, and the NOR gate 8. This voltage-reduction detection circuit has a configuration that outputs a signal to perform notification when an application voltage (drain voltage) for the switching device Q is reduced from an OFF-period voltage "Voff", which is higher than an input voltage "Vin" shown in FIG. 2(a), to the input voltage "Vin" in an OFF period of the switching device Q.

In particular, a pulse corresponding to a waveform of the drain voltage of the switching device Q is generated in the supplementary coil NS, and according to this, a voltage having a waveform (as shown in FIG. 2(c), which is a reversed waveform (as shown in FIG. 2(d) of the application voltage, is applied and added to the input terminal "b" of the NOR gate 8.

In the OFF period, while energy in the transformer T is being transferred from a primary section to a secondary section, as shown in FIG. 2(a), the application voltage is substantially stabilized at the OFF-period voltage "Voff" which is higher than the input voltage "Vin"; however, when the energy transfer from the primary section to the secondary section is completed, an LC resonance of the primary coil N1 and a parasitic capacitance "Coss" of the switching device Q starts and an electric charge stored in the parasitic capacitance "Coss" starts flowing to the primary coil N1, by which the application voltage for the switching device Q begins to be reduced.

When, according to this reduction of the application voltage for the switching device Q, the level of the signal applied to the input terminal "b" of the NOR gate 8 is increased, and the application voltage for the switching device Q is reduced to the level of the input voltage "Vin". Circuit constants of the resistors 5 and 6 and DC bias power supply 7 are defined so that the reduced application voltage in a case as described above is increased to reach a threshold voltage level.

The NOR gate has a configuration functioning as described below. Levels of pulse signals which are outputted while signals of which the levels are higher than a threshold voltage level defined for at least one of the two input terminals "a" and "b" are being applied, are forced low, and levels of signals applied to the input terminal "a" are always maintained low. Therefore, as described above, when the application voltage for the switching device Q is reduced, a signal of which the level is higher than the level of the threshold voltage level is applied to the input terminal "b" of the NOR gate 8; thereby the level of an output signal from the NOR gate 8 is reversed from a high level to a low level, and then the voltage-reduction detection circuit outputs a signal notifying that the application voltage for the switching device Q has been reduced to the level of the input voltage "Vin".

By the NOR gate 12, the resistor 15, and the diode 16, a zero-voltage detection trigger generation circuit is formed. Upon receipt of a voltage-reduction detection signal from the voltage-reduction detection circuit, the zero-voltage detection trigger generation circuit reverses the level of the pulse-control signal outputted from the multivibrator from a high level to a low level to generate a trigger for turning ON the switching device Q. Furthermore, a zero-voltage switching control circuit is formed by the aforementioned voltage-reduction detection circuit and zero-voltage switching control circuit.

In this embodiment, individual circuit constants in the aforementioned zero-voltage switching control circuit are defined so that the switching device Q is turned ON after a ¼ period of the LC resonance by the primary coil N1 and the parasitic capacitance "Coss" has elapsed since the time when the application voltage for the switching device Q is reduced to the level of the input voltage "Vin".

As described above, the switching device Q is turned ON with a time delay after the application voltage for the switching device Q has been reduced to the level of the input voltage "Vin"; therefore, the switching device Q can be turned ON in a state where the application voltage has been reduced to the lowest level.

Furthermore, a zero-voltage switching operation pause circuit is formed. This circuit pauses switching-on control operations by the zero-voltage switching control circuit in a period in which the level of the pulse-control signal outputted from the multivibrator is reversed by the zero-voltage switching control circuit to a higher level and a new primary-side pulse (drain pulse) is outputted.

Furthermore, a lowest frequency definition circuit is formed by the resistor 21 and the capacitor 18. This circuit defines the lowest value of a vibration frequency of the pulse-control signal outputted from the multivibrator.

This embodiment has a configuration such as that described above. Hereinbelow, a description will now be given of a circuit operation by the DC-DC converter according to this embodiment, with reference to the timing chart in FIG. 2.

As shown in FIG. 2(g), when the level of a voltage signal outputted from the NOR gate 12 is reversed from a low level (L) to a higher level (H) (time t1 in FIG. 2), this high-level signal serially passes through the resistor 15 and the diode 16 and is applied to the input terminal "a" of the NOR gate 13. As described earlier, levels of signals which are outputted while signals of which levels are higher than a threshold voltage level defined for at least one of the two input terminals "a" and "b" are being applied, are turned low by the NOR gate 12. Accordingly, when high-level signals are applied to the input terminal "a" of the NOR gate 13, levels of signals outputted to the input terminal "a" of the NOR gate 14 are turned low.

Levels of individual signals applied to the input terminal "b" of the NOR gate 14 and the input terminal "a" of the NOR gate 8 are maintained low by the DC bias power supply 7. Accordingly, as described above, when low-level signals are applied from the NOR gate 13 to the input terminal "a" of the NOR gate 14, both input terminals of the NOR gate 14 are in a state where the low-level signals are applied to them, and as shown in FIG. 2(c), the level of a signal to be applied from the NOR gate 14 to the gate of the switching device Q is reversed to be high to turn ON the switching device Q (time t2).

Furthermore, the high-level signal outputted from the aforementioned NOR gate 14 passes through the diode 17 in the ON state and is applied to the capacitor 11 and the NOR gate 12, and concurrently, the foregoing signals are supplied to the capacitor 18; by which the level of the signals are reversed to be low, and the capacitors 11 and 18 are charged.

Thereafter, in a period when the switching device Q is maintained ON, since the diode 10 is in the ON state and the charged voltage of the capacitor 11 is maintained, the charged voltage of the capacitor 11 is applied to the input terminal "a" of the NOR gate 12 as a high-level signal, no signals are outputted from the NOR gate 12 to the NOR gate 13, switching-on control operation by the aforementioned zero-voltage switching control circuit is turned to be in a pausing state.

In this way, in the period when the switching device Q is maintained ON, although a signal is not applied from the NOR gate 12 to the input terminal "a" of the NOR gate 13, a high-level signal is applied to the input terminal "a" of the NOR gate 13 according to a charged voltage of the capacitor 18; therefore, low-level signals are continuously outputted to the input terminal "a" of the NOR gate 14, and as a result thereof, the pulse-control signal applied from the NOR gate 14 to the switching device Q is maintained at a higher level to maintain the switching device Q ON.

The switching device Q is turned OFF when the high-level pulse-control signal applied from the NOR gate 14 to the switching device Q is reversed to be low (time t3) according to a circuit operation by the aforementioned pulse-width variable control circuit, which is performed depending upon the level of a feedback signal outputted from the feedback signal forming circuit 27 to the impedance variable circuit 22.

When the switching device Q is turned OFF, the parasitic capacitance "Coss" of the switching device Q is quickly charged and, as shown in FIG. 2(a), the drain-side voltage of the switching device Q rises to the level of the OFF-period voltage "voff" to generate a primary-side pulse. According to this primary-side pulse, as shown in FIG. 2(d), a voltage at the connection section X of the resistor 5 and the resistor 6 is reduced to cause the diode 10 to be in a conductive state, by which the charged voltage of the capacitor 11 is discharged through the diode 10 to reset the pausing state of the switching-on control by the aforementioned zero-voltage switching control circuit.

According to the discharge from the capacitor 11, the level of the signal applied to the input terminal "a" of the NOR gate 12 is turned low. At the same time, however, the level of a signal applied from the connection section X of the resistors 5 and 6 to the input terminal "b" of the NOR gate 8 is reversed to be a low level to reverse the level of the signal applied from the NOR gate 8 to the input terminal "b" of the NOR gate 12 to a high level. This result resets a state where signals are suspended to be outputted from the NOR gate 12 to the NOR gate 13.

In the period when the switching device Q is turned OFF, when the energy transfer from the primary section to the secondary section is completed, an LC resonance by the primary coil N1 and the parasitic capacitance "Coss" of the switching device Q starts and an electric charge charged in the parasitic capacitance "Coss" starts flowing to the primary coil N1, by which the application voltage (drain voltage) for the switching device Q starts reducing from the level of the OFF-period voltage "Voff", as shown in FIG. 2(a), and according to this reduction of the application voltage, the level of the signal applied to the input terminal "b" of the NOR gate 8 starts rising, as shown FIG. 2(d).

When the application voltage for the switching device Q reduces to the level of the input voltage "Vin" (time t5), the level of the signal to be applied to the input terminal "b" of the NOR gate 8 reaches a threshold voltage level to reverse the level of the signal to be outputted from NOR gate 8 to the input terminal "b" of the NOR gate 12 to be low, as shown in FIG. 2(f).

At this time, the capacitor 11 is in a discharging state and a low-level signal is applied to the input terminal "a" of the NOR gate 12; therefore, levels of signals applied to the input terminals "a" and "b" of the NOR gate 12 are all turned to be low, and the level of output signal from the NOR gate 12 is reversed to be high, as shown in 2(g). By this, as described earlier, this high-level signal is serially passed through the resistor 15 and the diode 16 and is applied to the input terminal "a" of the NOR gate 13. As a result of the above, the level of the pulse-control signal outputted from the NOR gate 14 is reversed to be high to turn ON the switching device Q to allow zero-voltage switching to be performed.

As described above, this embodiment is configured such that, in the period when the switching device Q is OFF, the application voltage for the switching device Q is detected to have been reduced from the level of the OFF-period voltage "Voff" to the level of the input voltage "Vin". Therefore, problems arising from short-circuit loss at the switching device Q can be substantially avoided. This is described in more detail in the following paragraph.

The drain voltage of the switching device Q varies the DC input voltage "Vin" as an alternating-current (AC) zero-voltage level according to the LC resonance by the primary coil N1 and the parasitic capacitance "Coss"; and when the drain voltage of the switching device Q is lower than the level of the aforementioned input voltage "Vin" (i.e., the AC zero-voltage level) the electrical charge removed from the parasitic capacitance "Coss" of the switching device Q. Therefore, as described earlier, the application voltage for the switching device Q is detected to have been reduced to the level of the input voltage "Vin", by which the switching device Q is turned ON in a state where the parasitic capacitance "Coss" is not substantially charged; therefore, short-circuit loss can be substantially avoided.

Furthermore, this embodiment is configured such that in the period when the switching device Q is OFF, the application voltage for the switching device Q is detected to have been reduced to the level of the input voltage "Vin". This provides the advantages as described below.

In the configuration in which the drain voltage of the switching device Q is detected to have been reduced to a DC-zero-potential level to turn ON the switching device Q, there may be, for example, a case in which the drain voltage of the switching device Q is not reduced to the DC-zero-potential level and is rather stabilized at a level higher than the DC-zero-potential level for some reason. In such a case, the switching device Q cannot be turned ON. However, according to the LC resonance in the OFF-period of the switching device Q, the application voltage for the switching device Q is reduced to the level of the input voltage "Vin" without exception. Accordingly, even in the case in which the drain voltage of the switching device Q is not reduced to the DC-zero-potential level and is instead stabilized at a level higher than the DC-zero-potential level, a configuration such as that of this embodiment in which the application voltage for the switching device Q is detected to have been reduced to the level of the input voltage "Vin" can turn ON the switching device Q without fail with timing when the potential is reduced to the lowest level.

In particular, since this embodiment is configured so that in the period when the switching device Q is OFF, the switching device Q is turned ON after a ¼ period of the aforementioned LC resonance has elapsed since the reduction of the application voltage for the switching device Q to the level of the input voltage "Vin" is detected, the switching device Q can be turned ON in a state where the drain voltage is reduced to the lowest level to allow the zero-voltage switching control.

Furthermore, in this embodiment, a pulse signal outputted from the NOR gate 14 (logical element) is used as a control signal to drive the switching device Q, and a signal outputted from the logical element 14 to the gate of the switching device Q is quickly turned from a high level to a low level or is quickly reversed from the low level; therefore, the switching device Q can be quickly turned ON or OFF to substantially avoid switching loss.

As described above, since there is no short-circuit loss when the switching device Q is turned ON and OFF, no switching loss when the switching device Q is substantially caused, a DC-DC converter conforming to the needs for higher-frequency switching can be provided, and a DC-DC converter allowing easy size reduction can also be provided.

Furthermore, since logical elements are used to form the circuits and expensive ICs such as PWM control ICs and PFM control ICs are not used, the DC-DC converter can be inexpensive. Normally, a logical-element IC having at least two logical elements is used to form a circuit, and the price of the logical-element IC is much lower than that of the PWM control IC or PFM control IC. Therefore, a DC-DC converter having a cost much lower than that of a DC-DC converter having circuits including PWM control ICs or PFM control ICs can be provided easily. It will be understood that the DC-DC converter of the present invention provides novel advantages because, as described above, a converter can be provided which is cheaper so as to be competitive with the price of the RCC type converter, and in addition, the converter substantially avoids switching loss and short-circuit loss to provide better electrical characteristics than those of the RCC type converter.

Furthermore, in a period between a time when the level of the output pulse-control signal is reversed to a higher level and a time when the next primary-side pulse is outputted, the capacitor 11 is being charged; by which operations to output signals from the NOR gate 12 to the NOR gate 13 are in a pausing state to allow stabilization of circuit operations.

Furthermore, in this embodiment, the trigger is used to reverse the output level from the multivibrator so as to turn ON the switching device Q; that is, the signal-output operation from the NOR gate 12 to the NOR gate 13 is completed immediately after a high-level signal is outputted from the NOR gate 12 to the input terminal "a" of the NOR gate 13, by which an enlarged variable-control range can be maintained in the period when the switching device Q is ON. The above is described in more detail in the following paragraph.

In a period when high-level signals are outputted from the NOR gate 12 to the input terminal "a" of the NOR gate 13, the switching device Q cannot be turned OFF by the pulse-control signal; therefore, a period when the high-level signals are outputted from the NOR gate 12 to the NOR gate 13 is to define a lower-limit length of the period when the switching device Q is ON. According to this fact, as in the case of this embodiment, the period when the high-level signals are outputted from the NOR gate 12 to the NOR gate 13 is greatly shortened, by which the lower-limit length of the period when the high-level signals are outputted from the NOR gate 12 to the NOR gate 13 to allow the variable control range in the period when the switching device Q is ON to be enlarged.

Furthermore, this embodiment has a configuration in which the lowest vibration frequency of the pulse-control signal is formed. This surely avoids, for example, unexpected noise caused when the aforementioned vibration frequency is reduced to be lower than an audible frequency.

It will be understood that the present invention is not limited to the above embodiment. On the contrary, the invention is intended to cover various other embodiments. For example, the MOS-FET is used for the switching device Q in the embodiment; however, a bipolar transistor or an IGBT (insulated gate bipolar transistor) may be used for the switching device Q.

Furthermore, although the output side of the NOR gate 14 is directly connected to the gate of switching device Q in the embodiment, a current-amplifying circuit, such as a totempole circuit, for amplifying the current outputted from the NOR gate 14 may be included therebetween. When a configuration is made such that the current-amplifying circuit is included to amplify the output signal from the NOR gate 14 and to apply the amplified current to the gate of the switching device Q, a device requiring a larger current to be turned ON may be used for the switching device Q so as to comply with a requirement for use of a switching device Q of such a larger capacity.

Furthermore, in the embodiment, the voltage outputted from the secondary side of the transformer T to the load 3 is directly detected by use of the output-voltage dividing resistors 24 and 25 to create a feedback signal, and according to the feedback signal, the ON period of the switching device Q is subjected to variable control performed to stabilize the output signal; however, for example, the voltage to be applied to the supplementary coil NS may be indirectly detected as an output voltage for the load 3 to perform the variable control of the ON period of the switching device Q. Alternatively, in addition to the output-voltage dividing resistors 24 and 25, members such as a current transformer and a resistor (sense resistor) may be arranged at the source side of the switching device Q to detect an input signal for the DC-DC converter in order to create a feed-forward signal; and a current mode which is based on the feed-forward signal and the feedback signal detected and outputted by the output-voltage dividing resistors 24 and 25 may be used to perform the variable control of the ON period of the switching device Q.

Furthermore, in the embodiment, the voltage outputted to the load 3 is directly detected by use of the output-current detection resistor 26 to create a feedback signal, and according to the feedback signal, the ON period of the switching device Q is subjected to the variable control performed to stabilize the output signal; however, for example, a member such as a resistor may be arranged to indirectly detect an input signal flowing in the primary-side circuit in order to create a feed-forward signal; and based on the feed-forward signal, the variable control of the ON period of the switching device Q may be performed.

Furthermore, in the embodiment, the application voltage for the switching device Q is indirectly detected by use of the voltage applied to the supplementary coil NS; however, for example, resistors may be arranged in series between the drain and the source of the switching device Q to directly detect a voltage to be divided and applied to the arranged resistors as the application voltage for the switching device Q.

Furthermore, in the embodiment, the multivibrator is formed using NOR gates; however, it may be formed from different elements, such as inverter elements or NAND elements.

Furthermore, the NOR gate 8 in the embodiment may be replaced by a bipolar transistor or a MOS-FET. When one of these transistors is used, the circuit configuration is made such that, in the OFF period of the switching device Q, when the application voltage for the switching device Q is reduced to the level of input voltage "Vin", the level of a signal to be applied to the input terminal "b" of the NOR gate 12 is turned low, and the level of the signal outputted from the NOR gate 12 is reversed to be high.

Furthermore, the NOR gate 12 in the embodiment may be replaced by a bipolar transistor or a MOS-FET. When one of these transistors is used, the circuit configuration is made such that, in the OFF period of the switching device Q, when the application voltage for the switching device Q is reduced to the level of input voltage "Vin", a high-level signal passes through sequentially either one of the bipolar transistor and the MOS-FET, the resistor 15, and then the diode 16 to be applied to the input terminal "a" of the NOR gate 13.

Furthermore, in the embodiment, the switching device Q is turned ON after a ¼ period of the aforementioned LC resonance has elapsed since the reduction of the application voltage for the switching device Q to the level of the input voltage "Vin"; however, the delay until the time when the switching device Q is turned ON after the application voltage for the switching device Q is reduced to the level of the input voltage "Vin" is not restricted to the aforementioned ¼ period of the LC resonance and may be a time period sufficient to perform the zero-voltage switching.

Furthermore, the embodiment has a configuration such that the application voltage for the switching device Q is detected to have been reduced to the level of the input voltage "Vin". However, the configuration may be modified so that the application voltage for the switching device Q is detected to have been reduced to the level of an input voltage and to a level of an input voltage region Z shown in FIG. 2(*a*), which is a neighbor region of the aforementioned level of the input voltage. For example, a configuration may be such that the application voltage for the switching device Q is detected to have been reduced to a different predetermined voltage level from the level of the input voltage "Vin" within the input voltage region Z. When a configuration is made so that the application voltage for the switching device Q is detected to have been reduced to a predetermined voltage level in an input voltage region which is higher than the input voltage "Vin", the zero-voltage switching can be performed by making the circuit configuration in which the switching device Q is turned ON after a delay time set to be longer than a ¼ period of the LC resonance.

Furthermore, the embodiment has the zero-voltage switching operation pause circuit. However, when a circuit-operation stabilization circuit is arranged to stabilize circuit operations, the zero-voltage switching operation pause circuit may not need to be used.

Figure 4:
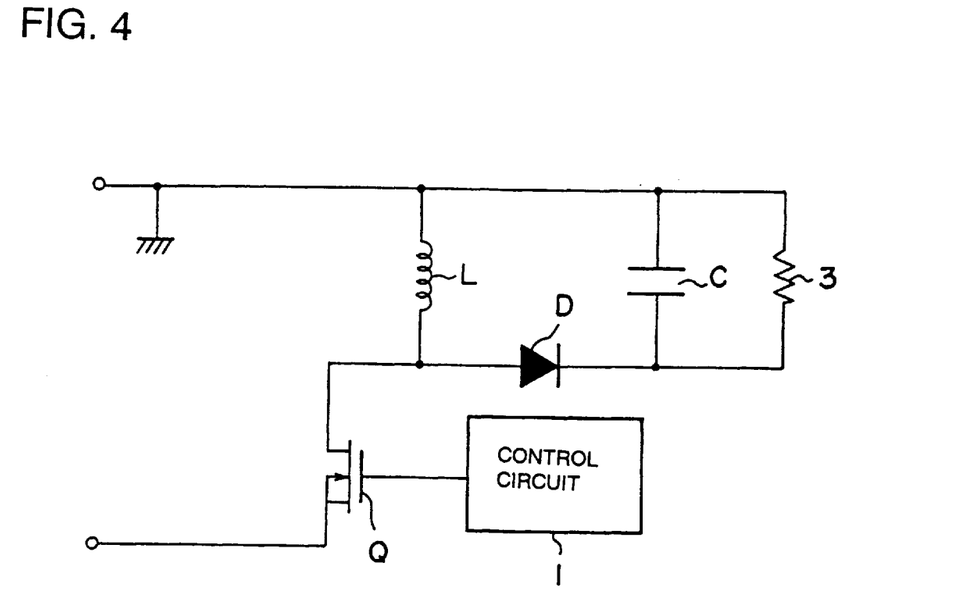
FIG. 4 shows an example of main circuit configurations of a pressure-elevating type converter.

Furthermore, the embodiment has been described using a flyback converter as an example. However, the flyback converter can be represented in an equivalent circuit such as that shown in FIG. 4. The circuit shown in FIG. 4, which has an inductance L in place of the transformer T, is equivalent to a circuit of a pressure-elevating type converter. From this fact, it will be understood that the present invention may be applied to the pressure-elevating type converter to provide the same advantages as those in the case of the embodiment.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A DC-DC converter comprising:

a primary-side circuit performing LC resonance synchronously with ON/OFF operations performed by a switching device by using a DC input voltage for generating a primary-side pulse in a period when the switching device is OFF to output energy to a secondary side, the switching device having two main terminals for switching a switched current, an application voltage being applied to one of said main terminals thereof and a pulse control signal being applied to a control terminal thereof;

an oscillation circuit outputting the pulse-control signal that controls the ON/OFF operations of the switching device, wherein variable control is performed for an ON period of the pulse-control signal outputted from said oscillation circuit to stabilize current and voltage outputted from the secondary side, said oscillation circuit comprising a multivibrator having at least two logical elements; and a zero-voltage switching control circuit that detects reduction of the primary-side pulse-control signal to be applied to the switching device in a period when the switching device is OFF and after detecting the application voltage for the switching device from an OFF-period voltage level which is higher than the level of the input voltage to an input voltage region, reverses a level of the pulse-control signal outputted from the multivibrator to a higher level in order to turn ON the switching device.

2. The DC-DC converter according to claim 1, wherein, in the period when the application voltage for the switching device is OFF, after reduction of the application voltage for the switching device from the OFF-period voltage level to the input voltage level which is an AC-zero-voltage level of the primary-side is detected, the level of the pulse-control signal outputted from the multivibrator is reversed to a higher level to turn ON the switching device.

3. The DC-DC converter according to claim 1, comprising a zero-voltage switching operation pause circuit that pauses switch-ON operations in said zero-voltage switching control circuit in a period between a time when the pulse-control signal outputted from the multivibrator is reversed by said zero-voltage switching control circuit to a higher level and a time when a following primary-side pulse is outputted.

4. The DC-DC converter according to claim 2, comprising a zero-voltage switching operation pause circuit that pauses switch-ON operations in said zero-voltage switching control circuit in a period between a time when the pulse-control signal outputted from the multivibrator is reversed by said zero-voltage switching control circuit to a higher level and a time when a following primary-side pulse is outputted.

5. A method of operating a DC-DC converter comprising the steps of:

providing a primary-side circuit performing LC resonance synchronously with ON/OFF operations performed by a switching device by using a DC input voltage for generating a primary-side pulse in a period when the switching device is OFF to output energy to a secondary side, the switching device having two main terminals for switching a switched circuit, applying an application voltage to one of the main terminals of the switching device and applying a pulse control signal to a control terminal of the switching device;

providing variable control for an ON period of the pulse-control signal to stabilize current and voltage outputted from the secondary side; and detecting reduction of the primary-side pulse-control signal applied to the switching device in a period when the switching device is OFF and after detecting the application voltage for the switching device from an OFF-period voltage level which is higher than the level of the input voltage to an input voltage region, reversing a level of the pulse-control signal to a higher level in order to turn ON the switching device.

6. The method according to claim 5, wherein, in the period when the application voltage for the switching device is OFF, after reduction of the application voltage for the switching device from the OFF-period voltage level to the input voltage level which is an AC-zero-voltage level of the primary-side is detected, reversing the level of the pulse-control signal to a higher level to turn ON the switching device.

7. The method according to claim 5, further comprising pausing switch-ON operations in a period between a time when the pulse-control signal is reversed to a higher level and a time when a following primary-side pulse is outputted.

8. The method according to claim 6, further comprising pausing switch-ON operations in a period between a time when the pulse-control signal is reversed to a higher level and a time when a following primary-side pulse is outputted.

* * * * *